(12) United States Patent
Emura

(10) Patent No.: US 6,453,340 B1
(45) Date of Patent: Sep. 17, 2002

(54) DATA CONVERTER AND TERMINAL CONTAINED IN NETWORK

(75) Inventor: Satoshi Emura, Toyonaka (JP)

(73) Assignee: Matsushita Electric Industrial, Co., Osaka (JP)

( * ) Notice: Subject to any disclaimer, the term of this patent is extended or adjusted under 35 U.S.C. 154(b) by 0 days.

(21) Appl. No.: 09/275,450

(22) Filed: Mar. 24, 1999

(30) Foreign Application Priority Data

Sep. 30, 1998 (JP) .......................................... 10-277226

(51) Int. Cl.⁷ ............................................... C06F 15/16
(52) U.S. Cl. ........................................ 709/206; 709/217
(58) Field of Search ................................ 709/206, 217, 709/225, 232, 250

(56) References Cited

U.S. PATENT DOCUMENTS

| | | | |
|---|---|---|---|
| 6,092,114 A | * 7/2000 | Shaffer et al. | 709/232 |
| 6,101,320 A | * 8/2000 | Schuetze et al. | 709/206 |
| 6,216,161 B1 | * 4/2001 | Feigenbaum et al. | 709/225 |
| 6,256,666 B1 | * 7/2001 | Singhal | 709/217 |
| 6,360,252 B1 | * 3/2002 | Rudy et al. | 709/206 |

\* cited by examiner

Primary Examiner—N. Le
Assistant Examiner—Walter Benson
(74) Attorney, Agent, or Firm—Wenderoth, Lind & Ponack, L.L.P.

(57) ABSTRACT

When data which cannot be processed is attached to an E mail routed to a terminal, an alternate URL for specifying the attached data is issued. A browser portion accesses a Web server utilizing the alternate URL. A data converter acquires from a mail server an E mail specified by mail acquiring information constituting a part of the alternate URL. That is, the data converter receives the E mail routed to the terminal in place of the terminal. The data converter specifies the attached data which cannot be processed on the basis of an attaching number in the alternate URL, to convert the attached data into data in a format which can be processed by the terminal. The converted data is transmitted to the terminal through the Web server. The browser portion displays on a display portion the data having the format which can be processed and refers a user to the data. Even if a terminal on the transmission side attaches to the E mail data, generated by application software, which cannot be correctly displayed by a terminal on the receiving side, therefore, the terminal on the receiving side can receive from the data converter data in a format which can be displayed and display the received data.

20 Claims, 11 Drawing Sheets

F I G. 7

| EXAMPLE OF ALTERNATE URL (ACTUALLY CONTAINED ON ONE LINE) | DESCRIPTION | |
|---|---|---|
| http: | SCHEME | |
| //www.foo.bar.com | HOST NAME OF WEB SERVER 6 | |
| /cgi=bin/modify-mail.cgi | PATH NAME OF DATA CONVERTER 5 | |
| ?server=132.182.100.200 | SERVER NAME OF MAIL SERVER 7 | ⎫ NOTIFY OF MAIL ACQUISITION INFORMATION USING QUERY |
| +user=usr1 | USER ID | |
| +password=pass1 | PASSWORD | |
| +id=98081@bar.com | MESSAGE ID ASSIGNED TO E MAIL | |
| +no=2 | ATTACHING NUMBER | ⎭ |

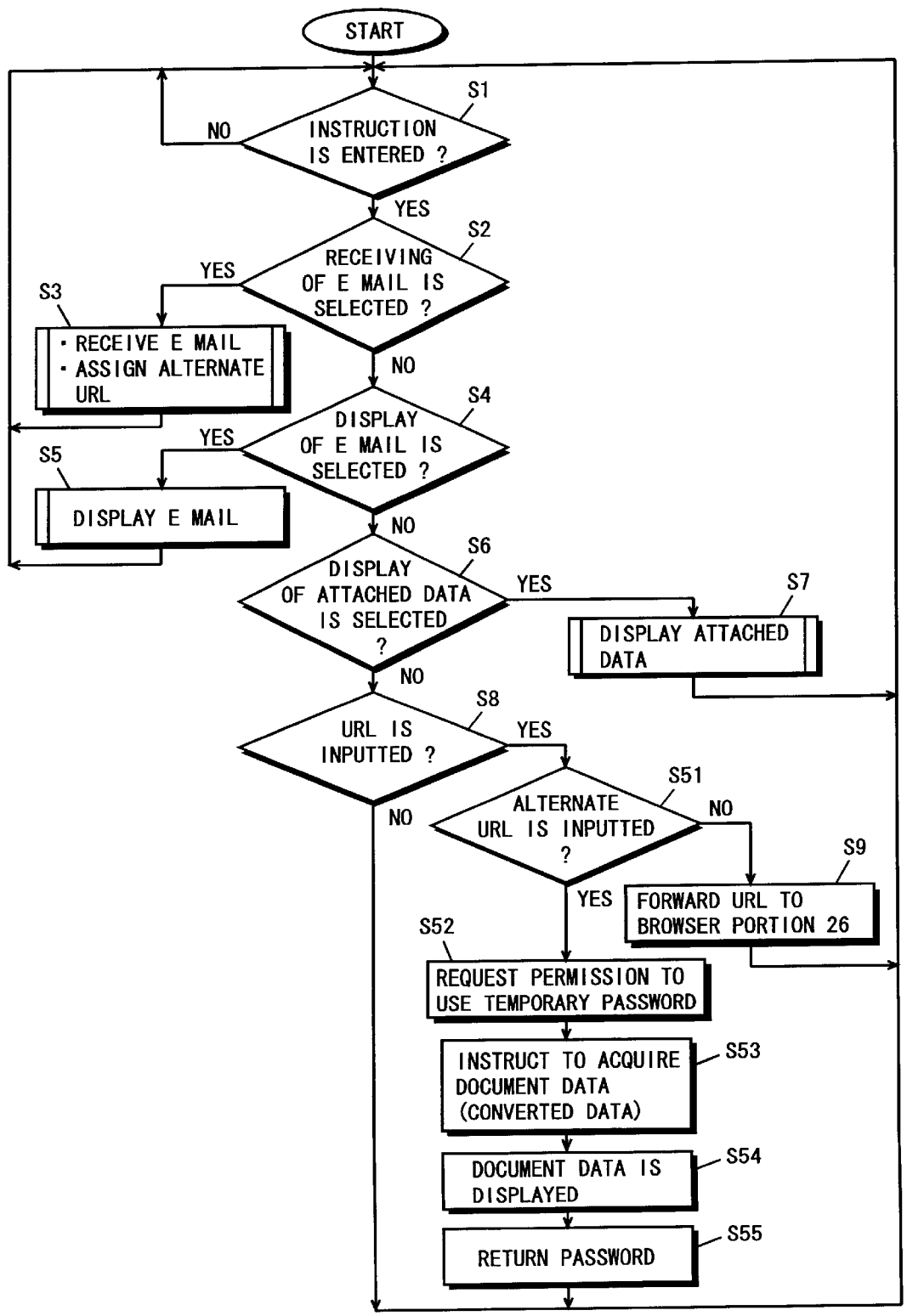

F I G. 1 4

| EXAMPLE OF ALTERNATE URL (ACTUALLY CONTAINED ON ONE LINE) | DESCRIPTION |
|---|---|
| http: | SCHEME |
| //www.foo.com | HOST |
| :8080 | PORT |
| /info/new-products.html | PATH |
| ;param | PARAMETER |
| ?name=john | QUERY |
| #last_content | FRAGMENT |

DATA CONVERTER AND TERMINAL CONTAINED IN NETWORK

BACKGROUND OF THE INVENTION

1. Field of the Invention

The present invention relates generally to a data converter and a terminal, and more particularly, to a terminal and a converter for converting data, which are attached to an E mail (electronic mail) routed to the terminal, into data in a format which can be processed by the terminal.

2. Description of the Background Art

As the Internet techniques have progressed in recent years, the environment in which an E mail can be transmitted and received, or the environment in which WWW (World Wide Web) can be accessed have been prepared in offices, homes, and so forth. A terminal which is represented by a personal computer (hereinafter abbreviated as PC) is used for the transmission and receiving of the E mail and the access to the WWW.

As high-density packaging technology and wireless communication technology have progressed, a portable terminal which is represented by a notebook-sized PC and a personal digital assistant has spread. If a user uses the portable terminal, the user can transmit or receive an E mail or refers to information stored in the WWW through a subscriber line even from the place where he or she has gone. The portable terminal is connected to a network on the basis of a protocol which is represented by PPP (Point-to-Point Protocol), and accesses a mail server or the WWW through the network, to acquire the E mail or the information.

In the present specification, the mail server means an equipment contained in the network for delivering the E mail to the terminal or the portable terminal. SMTP (Simple Mail Transfer Protocol) or POP3 (Post Office Protocol 3) are generally used for transmission or receiving of the E mail between the mail server and the terminal or the portable terminal. That is, examples of the mail server include one for processing the E mail transmitted from the terminal or the portable terminal in accordance with the SMTP (a so-called SMTP server) and one for processing the E mail received by the terminal or the portable terminal in accordance with the POP3 (a so-called POP server). The SMTP server and the POP server may, in some cases, be independent equipments. However, the same equipment may, in some cases, combine the functions of the SMTP server and the POP server. Whether or not the SMTP server and the POP server are independent of each other is not directly related to the present invention. In the specification, however, the mail server shall have the functions of both the SMTP server and the POP server for convenience.

When the terminal acquires the E mail from the mail server, the name of the mail server or an IP address assigned by the mail server, and a user ID and a password for accessing the mail server are required. When the terminal transmits the E mail to the mail server, a message ID is assigned to the E mail. The message ID may, in some cases, be used for specifying whether the E mail has already been acquired or has not been acquired yet between the terminal and the mail server because it uniquely specifies the E mail.

At the beginning, only a character in a text format has been transmitted or received as data by the E mail. However, data other than the character in the text format has been generally attached to the E mail using MIME (Multipurpose Internet Mail Extensions) in recent years. Attached to the E mail is data generated by various types of application software which are represented by image processing, document processing, or spreadsheet or data generated in HTML (Hyper Text Markup Language) as an example.

In order to realize the above-mentioned function of the E mail, software referred to as a mailer is installed in the terminal or the portable terminal. The installed mailer performs processing which is represented by transmission or receiving, display, editing, or arrangement of the E mail in accordance with an instruction from the user. Almost all mailers for the terminal correspond to MIME, and can process the E mail to which data is attached. In the terminal, when the data attached to the E mail is selected by the user, the application software which is related to the attached data is started, to display the attached data. Further, the application software of the document processing may, in some cases, have the function of not displaying the attached data as it is but analyzing the attached data, and then converting the analyzed attached data into data in a text format and displaying the data in the text format.

An example of a device constituting the WWW is a Web server. The Web server gets a request from the terminal or the portable terminal, and retrieves document data designated by the request from an internal storage area. Thereafter, the Web server transmits the retrieved document data to the terminal or the portable terminal which has issued the request through the WWW. HTTP (Hyper Text Transfer Protocol) is used as a transfer protocol between the terminal or the portable terminal and the Web server. The document data which is handled by the terminal or the portable terminal and the Web server is typically generated in HTML. Uniqueness in the WWW of the document data is maintained. The uniqueness is realized by a character representing an address referred to as URL (Uniform Resource Locator). URL may, in some cases, be referred to as a URL address, an address, and an Internet address. URL is constituted by portions called a scheme, a host, a port, a path, a parameter, a query, and a fragment, as illustrated as an example in FIG. 14.

The Web server may, in some cases, have the function of executing a computer program referred to as CGI (Common Gateway Interface). In many cases, CGI is a script described in a language represented by Perl or typically a computer program in an execute format described in a C language. CGI can be thus constituted by a script or a program. The Web server performs, when it can execute CGI, processing conforming to the program referred to as CGI on the basis of information transmitted from the terminal or the portable terminal, to transmit document data representing the results of the processing to the terminal which has transmitted the information.

The following are examples of a method of forwarding information required to execute CGI (i.e., a factor) from the terminal or the portable terminal:

(1) A method of the terminal setting the factor in the query included in URL assigned to CGI, and transmitting the factor to the Web server (corresponding to the use of a request method referred to as GET in the HTTP).

(2) A method of the terminal setting the factor in an entity body (contents displayed by the terminal), and transmitting URL assigned to CGI to the Web server (corresponding to the use of a request method referred to as POST in the HTTP).

Judgement as to which of the above-mentioned methods (1) and (2) should be employed by the Web server depends on the description of CGI.

The Web server starts, when URL assigned to CGI is designated by the factor transmitted by the terminal using the method (1) or (2), the designated CGI. The Web server executes CGI in accordance with the information transmitted from the terminal. The Web server executes CGI, to retrieve a data base previously holding data, for example, and transmit to the terminal document data, generated in HTML, representing the results of the retrieval.

Application software referred to as a user agent or a browser is installed in the terminal. The application software requests the Web server to transmit a Web page, and interrupts and displays the Web page transmitted from the Web server. Such application software is hereinafter merely referred to as a browser.

The browser has various functions. The typical functions include:

(1) The function of analyzing the document data generated in HTML and an image which are transmitted from the Web server, displaying the data and the image on a display of the terminal, and voice-outputting the data and the image when required.

(2) The function of requiring, when the user of the terminal selects Hot Spot embedded in the document data created in HTML or enters URL, the Web server to transmit the specified document data created in HTML.

(3) The function of transmitting, when the user enters information into a field embedded in the document data created in HTML, the entered information to the Web server.

Some of the recent mailers have the function of automatically extracting URL described in the E mail, and underlining or coloring the extracted URL, to inform the user of URL. In the terminal, when the user selects URL in the E mail displayed by the mailer, the browser is automatically started. The browser acquires from the Web server the document data created in HTML which is specified by the selected URL, and displays the acquired document data. The browser thus realizes good accessibility to the WWW in cooperation with the mailer.

As described in the foregoing, the transmission or receiving of the E mail has been convenient for the user, so that data can be attached to the E mail. However, a terminal on the transmission side may, in some cases, be unconscious of the application software installed in the terminal on the receiving side. That is, the terminal on the transmission side may, in some cases, attach to the E mail data generated by application software which the terminal on the receiving side does not have. In such a case, the terminal on the receiving side cannot correctly reproduce the attached data.

As described in the foregoing, the mailer and the browser have steadily increased in function year by year, so that they have been conveniently used. However, the portable terminal is made small in size and lightweight, low in power consumption, or low in cost depending on its portability. In many cases, the processing capabilities of a CPU (Central Processing Unit) and the memory capacity in the portable terminal are smaller than those in the normal terminal. Consequently, the portable terminal cannot desire more highly functional processing than the terminal even if it has the functions of the mailer and the browser. Therefore, the data attached to the E mail cannot be displayed and reproduced.

SUMMARY OF THE INVENTION

Therefore, an object of the present invention is to provide a data converter or a terminal capable of correctly displaying data attached to an E mail on the receiving side.

The present invention attains the above-mentioned objects by the following aspects.

A first aspect of the present invention is directed to a data converter contained in a network capable of transmitting and receiving an E mail between a terminal and a mail server for converting data attached to the E mail into data in another format, comprising:

a receiving portion for receiving mail acquiring information which the terminal uses to acquire the E mail from the mail server;

an acquisition portion for acquiring the E mail from the mail server on the basis of the mail acquiring information received by the receiving portion;

a conversion portion for converting the format of the data attached to the E mail acquired by the acquisition portion into another format which can be displayed by the terminal; and a transmission portion for transmitting to the terminal the data converted by the conversion portion.

The data converter according to the first aspect converts the data attached to the E mail into data in another format which can be displayed by the terminal, and transmits the converted data. Even if data which cannot be correctly displayed is attached to the E mail, therefore, the terminal can receive from the data converter data in a format which can be displayed by itself. The data converter is thus contained in the network, so that the terminal can correctly display the attached data.

A second aspect is dependent on the first aspect, wherein that the conversion portion further converts the format(s) of all data attached to the E mail acquired by the acquisition portion, and generates data representing an index which is related to the data converted by the conversion portion, and the transmission portion transmits each of the data converted by the conversion portion and the generated data representing the index.

According to the second aspect, the data converter collectively converts all the data attached to the E mail, and generates the data representing the index which is related to the converted data. The data converter further transmits to the terminal the converted data and the data representing the index, so that the terminal can simultaneously acquire the data attached to the E mail and further acquire the data representing the index from the data converter. Consequently, a user of the terminal can efficiently refer to the plurality of data, which have already been converted, simultaneously transmitted utilizing the index.

A third or fourth aspect is dependent on the first or second aspect, wherein that the transmission portion transmits the data converted by the conversion portion as an E mail to the terminal.

According to the third or fourth aspect, the data converter transmits the data converted by the conversion portion to the terminal with the data attached to the E mail. The terminal can acquire from the mail server the data converted by the data converter.

A fifth aspect is directed to a terminal, which is contained in a network with a mail server and a data converter, for acquiring an E mail from the mail server, comprising:

a mail acquisition portion for acquiring the E mail from the mail server on the basis of previously held mail acquiring information;

an issue portion for analyzing the E mail acquired by the mail acquisition portion and issuing an alternate URL including data specifying information for specifying data attached to the E mail and the mail acquiring information as required;

a transmission/instruction portion for transmitting the alternate URL issued by the issue portion and instructing the data converter to convert the format of data specified by the alternate URL into a predetermined data format; and a display portion for receiving the data converted by the data converter and displaying the received data.

The terminal according to the fifth aspect issues the alternate URL as required, and transmits the alternate URL to the data converter. The data converter acquires the E mail specified by the alternate URL from the mail server using the mail acquiring information from the terminal. That is, the data converter acquires the E mail in place of the terminal. The data converter converts the format of the data attached to the acquired E mail into a predetermined format. The terminal displays the data in the predetermined format. Even if data which cannot be correctly displayed is attached to the E mail, therefore, the terminal can receive from the data converter data in a format which can be displayed by itself and display the received data.

A sixth aspect is dependent on the fifth aspect, wherein that the issue portion issues the alternate URL only to the data which can be converted by the data converter out of the data attached to the E mail acquired by the mail acquisition portion.

According to the sixth aspect, the issue portion issues the alternate URL only to the data which can be converted by the data converter, and does not issue the alternate URL to the data which cannot be converted by the data converter. Consequently, no unnecessary alternate URL is issued.

A seventh or eighth aspect is dependent to the fifth or sixth aspects, further comprising a delete portion for deleting the attached data specified by the alternate URL issued by the issue portion.

When the alternate URL is issued, the attached data to which the alternate URL has been issued is unnecessary for the terminal. According to the seventh or eighth aspect, the unnecessary attached data is deleted, so that a storage area of the terminal can be effectively utilized.

Ninth to twelfth aspects are dependent on the fifth to eighth aspects, wherein that the issue portion issues the alternate URL further including an address assigned to the E mail, and the transmission/instruction portion transmits the alternate URL issued by the issue portion, converts the format of the data specified by the alternate URL into a predetermined data format, and instructs the data converter to transmit the E mail to which the converted data is attached.

According to the ninth to twelfth aspects, the terminal can acquire from the mail server the data converted by the data converter.

Thirteenth to twentieth aspects are dependent on the fifth to twelfth aspects, wherein that the issue portion includes temporary mail acquiring information in the alternate URL.

The mail acquiring information is generally information which is high in secrecy to the user of the terminal and is not desired to be known by the others. According to the thirteenth to twentieth aspects, the terminal causes the mail server to issue temporary mail acquiring information and includes the issued temporary mail acquiring information in the alternate URL. Consequently, the secrecy of the original mail acquiring information can be ensured.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 illustrates an alternate URL issued by the mail processing portion 22;

FIG. 13 is a flow chart showing the procedure for the overall processing of a mail processing portion 22 according to the second embodiment; and FIG. 14 illustrates an example of a general URL.

DESCRIPTION OF THE PREFERRED EMBODIMENTS

First Embodiment

Figure 1:
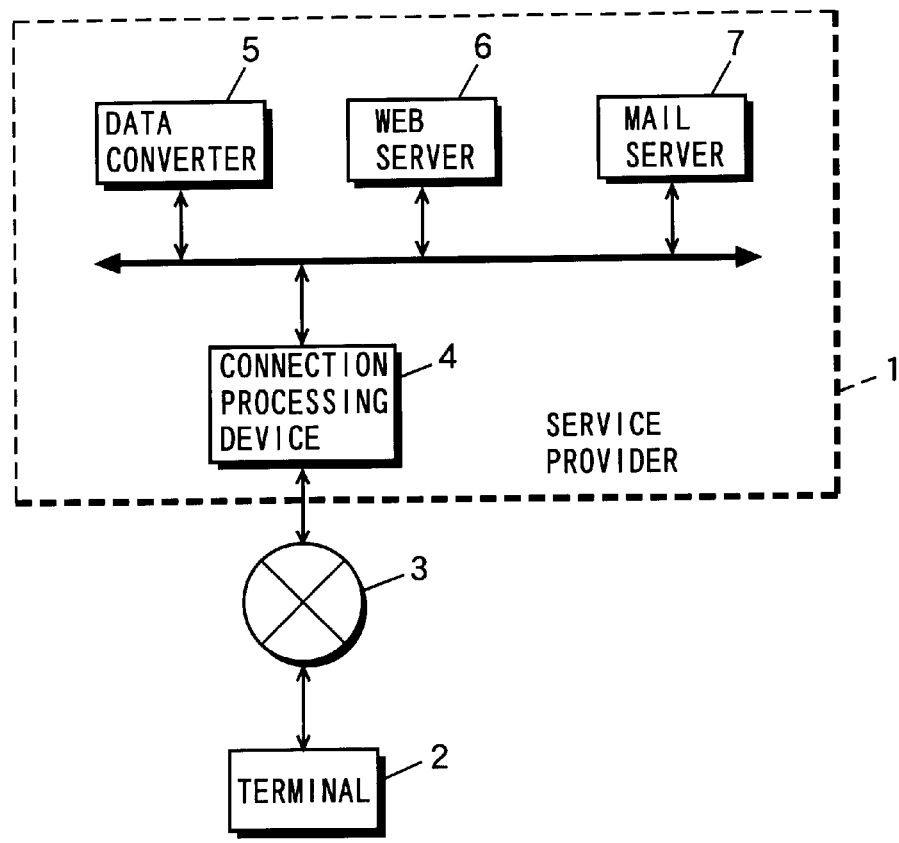
FIGS. 1(*a*) and 1(*b*) illustrate typical examples of a network according to a first or second embodiment of the present invention.
Figure 1:
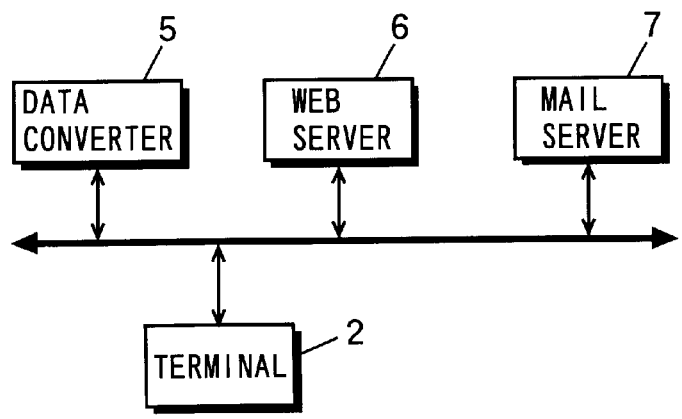

FIGS. 1(*a*) and 1(*b*) respectively illustrate typical examples of a network according to one embodiment of the present invention. FIG. 1(*a*) illustrates a large-scaled or medium scaled network which is represented by Internet or commercial personal computer communication. Facilities for a service provider 1 and a terminal 2 operated by a user are contained in the network shown in FIG. 1(*a*), and are connected through a subscriber line 3 such that they can communicate with each other. A connection processing device 4, a data converter 5, a Web server 6, and a mail server 7 are connected to the service provider 1 such that they can communicate with each other.

FIG. 1(*b*) illustrates a small-scaled network which is represented by LAN (Local Area Network). In FIG. 1(*b*), components corresponding to the components shown in FIG. 1(*a*) are assigned the same reference numerals. A terminal 2, a data converter 5, a Web server 6, and a mail server 7 are contained in the network shown in FIG. 1(*b*), and are connected such that they can communicate with one another.

Figure 2:
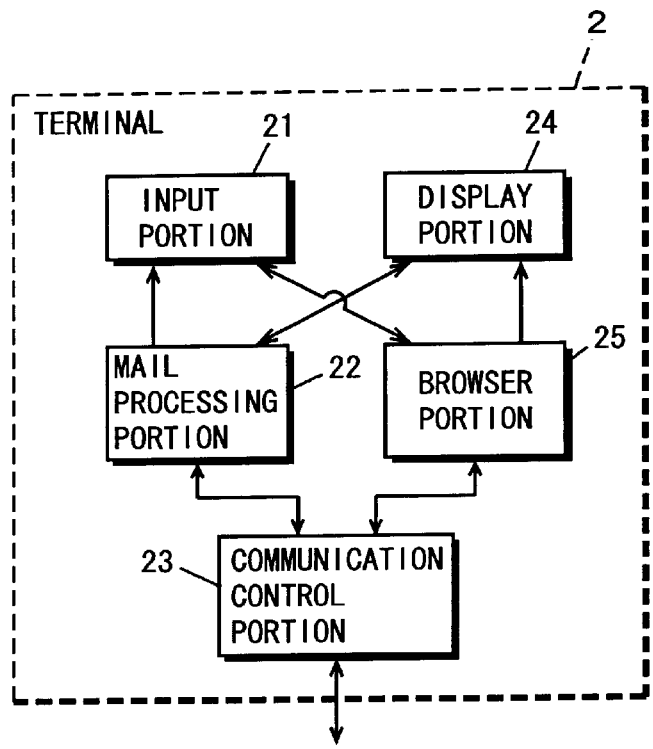
FIG. 2 illustrates a detailed block structure of a terminal 2 shown in FIG. 1(*a*) or 1(*b*)

As shown in FIG. 2, the terminal 2 shown in FIGS. 1(*a*) and 1(*b*) comprises an input portion 21, a mail processing portion 22, a communication control portion 23, a display portion 24, and a browser portion 25. The terminal 2 may be of a fixed type (desktop type) terminal which is represented by a personal computer or a portable type terminal which is represented by a personal digital assistant. The mail processing portion 22 has a typical structure for embodying a mail acquisition portion and an issue portion. The browser portion 25 has a typical structure for embodying a transmission/instruction portion.

Figure 3:
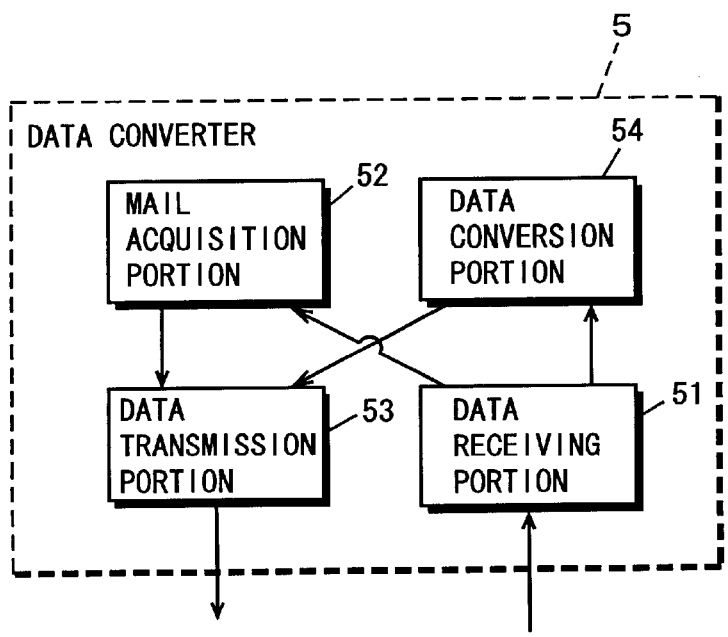
FIG. 3 illustrates a detailed block structure of a data converter 5 shown in FIG. 1(*a*) or 1(*b*)

The data converter 5 shown in FIGS. 1(a) and 1(b) comprises a data receiving portion 51, a mail acquisition portion 52, a data transmission portion 53, and a data conversion portion 54, as shown in FIG. 3. The data converter 5 typically operates in accordance with a program or a script described in a C language or Perl.

Figure 4:
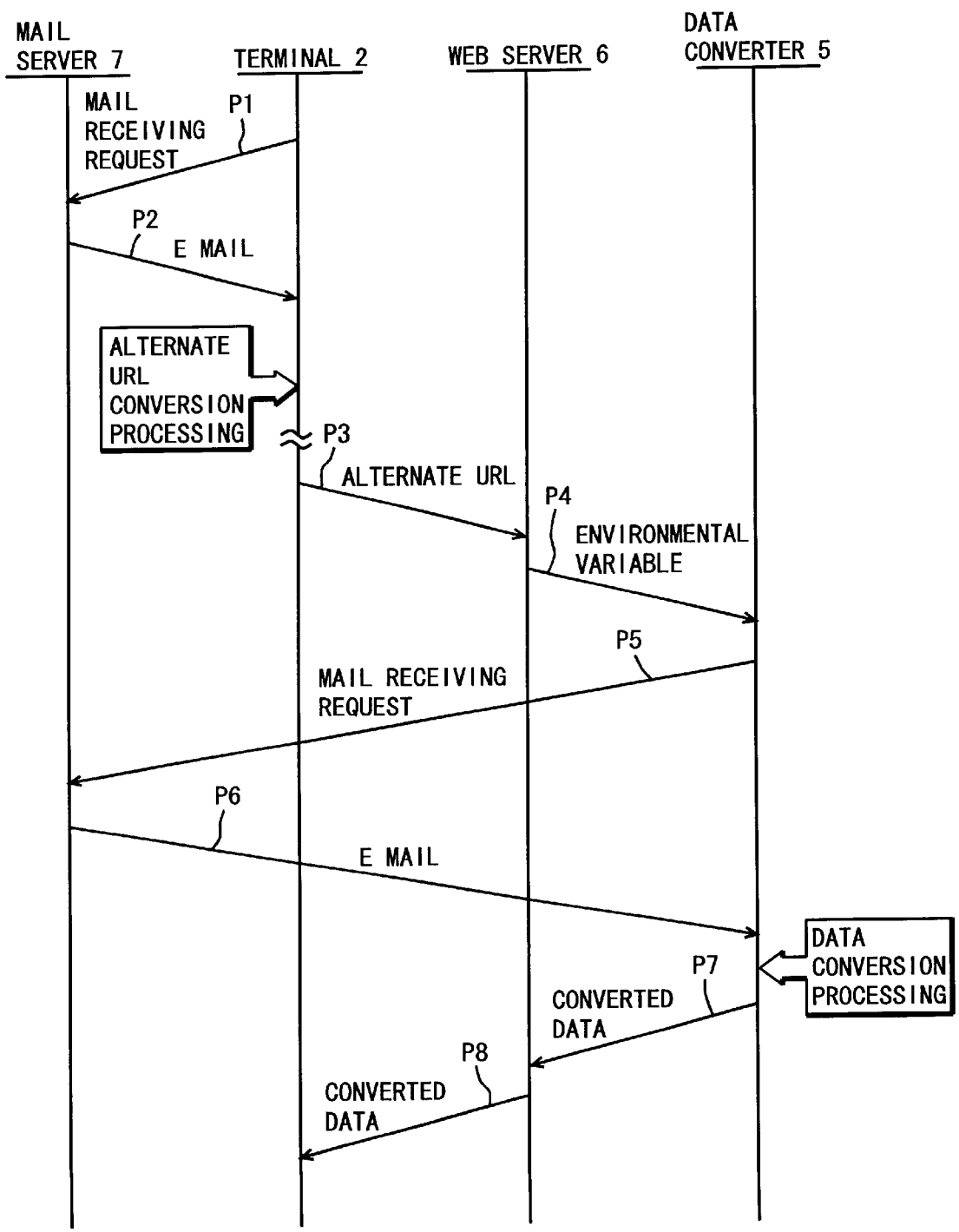
FIG. 4 is a sequence chart showing data communication in a network according to the first embodiment.

Data communication in the network will be described with reference to a sequence chart shown in FIG. 4. The detailed operations of the terminal 2, the data converter 5, the Web server 6, and the mail server 7 in the data communication will be respectively described.

Figure 5:
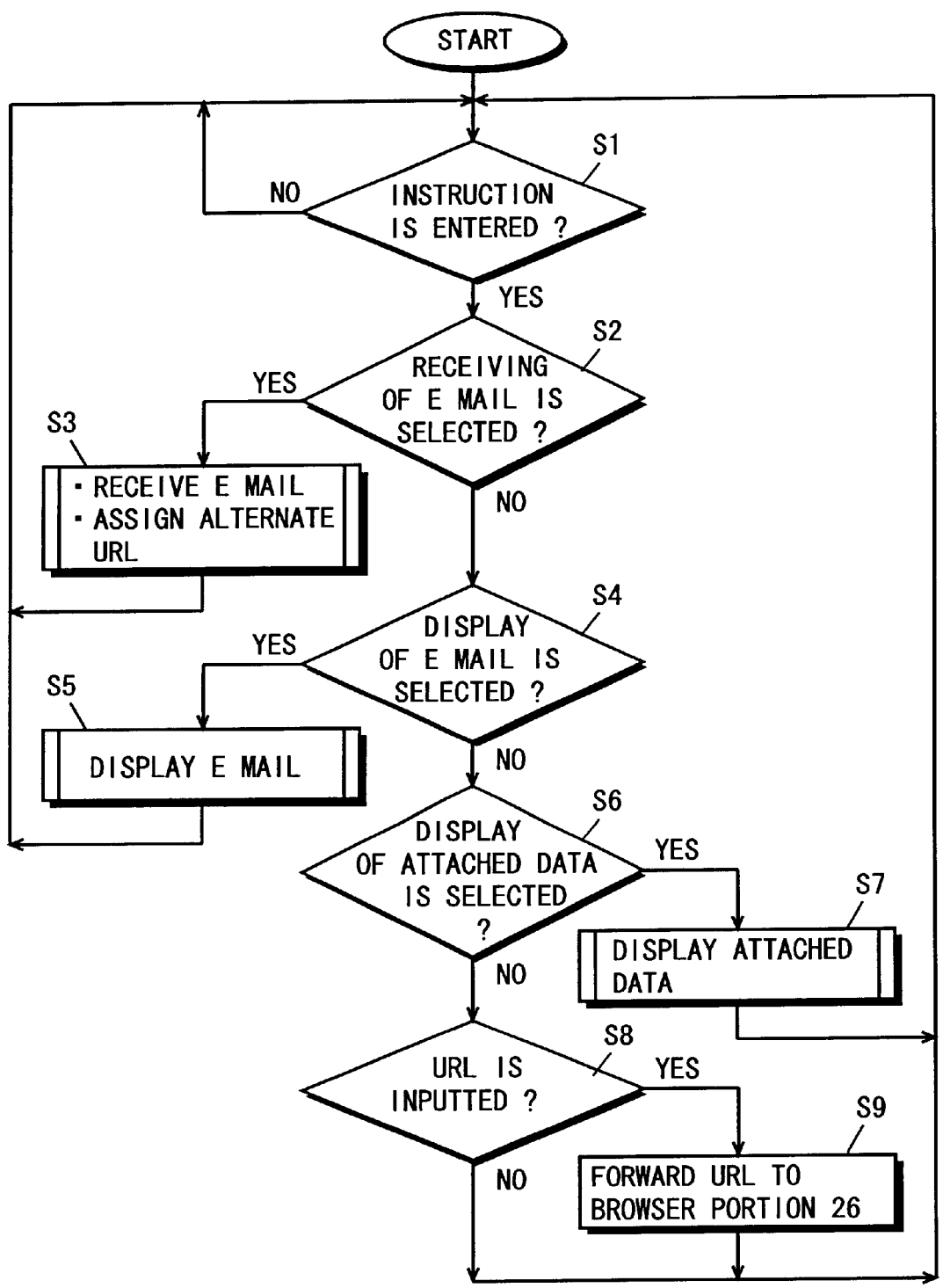
FIG. 5 is a flow chart showing the procedure for the overall processing of a mail-processing portion 22 according to the first embodiment.

The mail processing portion 22 in the terminal 2 operates in accordance with the procedure shown in a flow chart of FIG. 5. The mail processing portion 22 waits until an instruction from a user is entered through the input portion 21 (step S1). The input portion 21 is an interface with the user of the terminal 2, and gets various types of instructions from the user. Typical examples of the instructions are an instruction to receive an E mail, an instruction to display the E mail, and an instruction to display document data in the browser portion 25. Although a keyboard or a mouse is representative of the input portion 21, the input portion 21 can also be constituted by a virtual keyboard displayed on a display of the display portion 24 or a touch panel disposed on the display. The user directly touches the virtual keyboard or the touch panel with a pen or his or her finger, to enter each of the instructions. The input portion 21 outputs the instruction entered by the user to the mail processing portion 22 as it is.

The mail processing portion 22 proceeds, when the instruction from the user which is entered through the input portion 22 is the instruction to receive the E mail (step S2), to processing at the step S3. The detailed procedure at the step S3 is shown in a flow chart of FIG. 6. The mail processing portion 22 connects the terminal 2 to the network through the communication control portion 23 (step S1). In the network shown in FIG. 1(a), the communication control portion 23 establishes a connection with the connection processing device 4 in the service provider 1, so that the terminal 2 is connected to the network. The connection between the communication control portion 23 and the connection processing device 4 is generally established in accordance with PPP (Point-to-Point Protocol). Various types of signals defined by the PPP are communicated in accordance with TCP/IP (Transfer Control Protocol/Internet Protocol). On the other hand, in the structure shown in FIG. 1(b), a connection between the communication control portion 23 and the network is directly established, so that the terminal 2 is always connected to the network. In the network shown in FIG. 1(b), therefore, the mail processing portion 22 need not specially perform the processing at the step S3.

Mail acquiring information necessary to acquire the E mail from the mail server 7 is previously set in the mail processing portion 22. The mail acquiring information includes at least a mail server name, a user ID, and a password. The mail processing portion 22 transmits the mail acquiring information previously held to the mail server 7 through the communication control portion 23 subsequently to the step S11 (process P1 in FIG. 4). The mail server 7 transmits the E mail routed to the terminal 2 on the basis of the user ID and the password included in the mail acquiring information (process P2). The mail processing portion 22 receives the E mail through the communication control portion 23 (step S12). In the case of the above-mentioned mail receiving, the communication control portion 23 and the mail server 7 generally communicate with each other through POP3. Further, various types of signals defined by the POP3 are also communicated in accordance with the TCP/IP.

After the step S12, the mail processing portion 22 may, in some cases, continue the subsequent processing upon being disconnected from the network, or may, in some cases, continue the subsequent processing without being disconnected from the network.

The mail processing portion 22 judges whether or not all received E mails have already been processed (step S13) after the step S12. The mail processing portion 22 terminates, if all the E mails have already been processed, the processing shown in FIG. 6, that is, the step S3 shown in FIG. 5 because it need not perform the subsequent processing, to wait for a new instruction from the input portion 21.

If any of the E mails have not been processed yet at the step S13, one E mail which has not been processed yet is selected. The mail processing portion 22 judges whether or not data is attached to the selected E mail (step S14). If no data is attached thereto, the mail processing portion 22 stores the selected Email in a storage area (not shown) of the terminal 2 (step S18). On the other hand, if data are attached thereto, the mail receiving portion 22 judges whether or not each of the attached data has already been processed (step S15). The mail processing portion 22 proceeds, if all the attached data have already been processed, to the processing at the foregoing step S18 because it need not perform the subsequent processing.

If any of the attached files have not been processed yet at the step S15, one file of attached data which have not been processed yet is selected. The mail processing portion 22 analyzes the selected attached data which has not been processed yet, and judges whether or not the attached data has a format which can be processed (step S16). More specifically, the following processing is performed at the step S16. If the attached data is created in a text format or HTML, the terminal 2 can process the attached data using a standard function. Unless the attached data is created in a text format or HTML, however, the attached data cannot, in some cases, be processed by the terminal 2. It is examined at the foregoing step S16 whether or not the selected attached data has a data format which can be processed by the terminal 2.

The mail processing portion 22 returns, if the attached data is in a format which can be processed, to the processing at the step S15, considering that the attached data has already been processed, to search for the other attached data which have not been processed yet. The mail processing portion 22 proceeds, if the attached data is not in a format which can be processed, to processing at the step S17.

The mail processing portion 22 issues, if the attached data cannot be processed by the terminal 2, an alternate URL (Uniform Resource Locator) for the attached data (step S17). The alternate URL comprises a host name of the Web server 6, a path name of the data converter 5, and a query, as shown in FIG. 7. The name of the mail server 7 (i.e., a mail server name), a user ID and a password of the terminal 2, a message ID assigned to the E mail selected at the step S13, and an attaching number are set in the query. The attaching number is a number for specifying the data attached to the E mail selected at the step S16. The alternate URL is used when the user operates the browser portion 25 and refers to the attached data (as described later). The alternate URL is attached as data to the E mail selected at the step S14.

Figure 8:
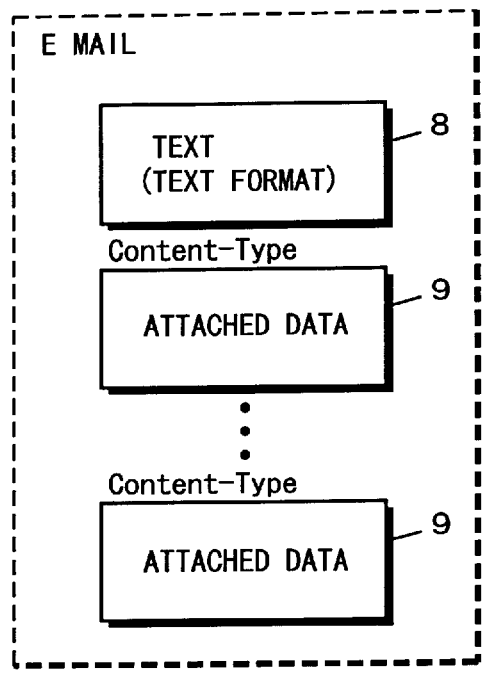
FIG. 8 schematically illustrates the structure of an E mail to which data are attached.

An example of a method of assigning the attaching number will be described with reference to FIG. 8. FIG. 8 schematically illustrates the structure of the E mail to which the data is attached. In FIG. 8, the E mail can be divided into a text (i.e., in a text format) 8 and attached data 9. If the E mail is in an MIME, the text 8 is set at the head of the E mail, and each of the attached data 9 is so set as to be subsequent to the text 8. Further, information referred to as Contents-Type is inserted into the head of each of the attached data 9. The mail processing portion 22 searches the E mail from its head part, to detect the Content-Type. Consequently, the presence or absence of the attached data can be known. The attached data 9 are assigned the attaching numbers in the order of increasing distance from the text 8.

When the foregoing step S17 is finished, the mail processing portion 22 returns to the processing at the step S15, to search for the other attached data which have not been processed yet. The foregoing steps S15 to S17 are carried out with respect to each of the data attached to the E mail selected at the step S14. That is, if it is assumed that there are two files of attached data which cannot be processed in a certain E mail, two alternate URLs are issued.

The mail processing portion 22 proceeds, when it performs processing with respect to all the data attached to the E mail, to the processing at the step S18, to store the E mail as one which has already been processed and store the E mail in the storage area (not shown) of the terminal 2 (step S18).

The mail processing portion 22 returns, after it performs the processing at the step S18, to the processing at the step S13. If there is an E mail which has not been processed yet at the step S13, the mail processing portion 22 performs the processing at the steps S14 to S18 with respect to the E mail. If there is no E mail which has not been processed yet at the step S13, the mail processing portion 22 finishes the processing shown in FIG. 6, that is, the step S3 shown in FIG. 5, to wait for a new instruction from the input portion 21.

Figure 9:
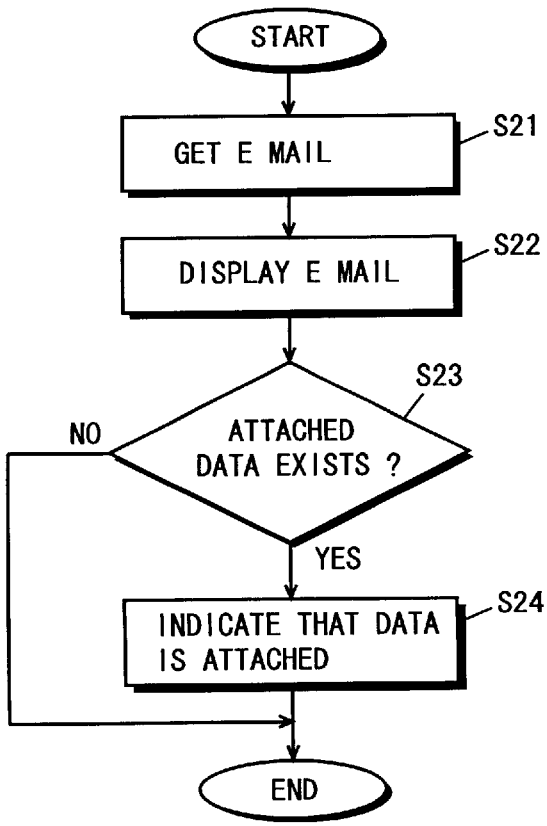
FIG. 9 is a flow chart showing the detailed procedure at the step S5 shown in FIG. 5.

The user may, in some cases, operate the input portion 21, to select an E mail to be referred to. The mail processing portion 22 proceeds, when it is instructed to display the E mail through the input portion 21 (at step S4 in FIG. 5), to processing at the step S5. The contents of the detailed processing at the step S5 are shown in a flow chart of FIG. 9. The mail processing portion 22 takes out the selected E mail from the storage area of the terminal 2 (step S21), and displays on the display portion 24 a text 8 (see FIG. 8) in the E mail taken out (step S22). At the step S22, the mail processing portion 22 underlines and colors, when it detects a character representing a URL (for example, a string of characters, the first of which is "http:" or "www") from the text 8, URL, to generate Hot Spot. The mail processing portion 22 notifies the user of URL described in the text 8 using the Hot Spot. When the user designates the Hot Spot by the input portion 21, the mail processing portion 22 forwards URL to the browser portion 25 (as described later).

In a case where the mail processing portion 22 finishes the processing at the step S22, if data is attached to the E mail (step S23), it is indicated on the display portion 24 that data is attached to the E mail (step S24). At the step S24, the mail processing portion 22 displays on the display portion 24 an icon of the attached data which is judged to be processable at the step S16 shown in FIG. 6 (see step S16). The mail processing portion 22 displays on the display portion 24 the alternate URL issued at the step S17 with respect to the attached data which cannot be processed. When the processing at the foregoing steps S21 to S24 is finished, the mail processing portion 22 finishes the processing shown in FIG. 9, that is, the processing at the step S5 shown in FIG. 5, to wait for a new instruction from the input portion 21.

The user operates, when he or she desires to display the data attached to the E mail, the input portion 21, and selects the icon displayed at the step S24, to specify the attached data. The mail processing portion 22 proceeds, when it is instructed to display the attached data through the input portion 21 (step S6 in FIG. 5), to processing at the step S7. The detailed procedure at the step S7 is shown in a flow chart of FIG. 10. The mail processing portion 22 judges whether or not the selected attached data is generated in a format which can be displayed (step S31). The mail processing portion 22 takes out, when the selected attached data can be processed, the attached data from the storage area (not shown) of the terminal 2, and displays the attached data on the display portion 24 (step S32). On the other hand, the mail processing portion 22 indicates on the display portion 24, when the selected attached data cannot be processed, that the attached data cannot be processed, and notifies the user that the attached data cannot be processed (step S33).

Figure 10:
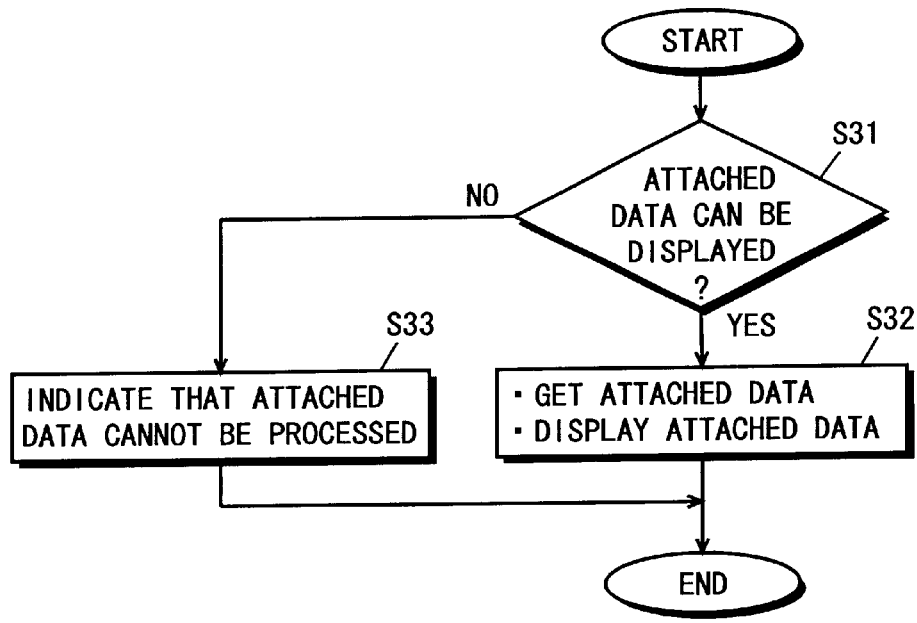
FIG. 10 is a flow chart showing the detailed procedure at the step S7 shown in FIG. 5.

When the foregoing steps S31 to S33 are finished, the mail processing portion terminates the processing shown in FIG. 10, that is, the step S7 shown in FIG. 5, to wait for a new instruction from the input portion 21.

The user can designate the Hot Spot by the input portion 21, and refer to document data specified by an URL assigned to the Hot Spot. The mail processing portion 22 forwards, when URL is inputted by the input portion 21 (step S8 in FIG. 5), the inputted URL to the browser portion 25 (step S9), to instruct the browser portion 25 to acquire and display corresponding document data. Thereafter, the mail processing portion 22 waits for a new instruction from the input portion 21.

At this time, the browser portion 25 may, in some cases, receive the alternate URL (see FIG. 7) from the mail processing portion 22. The browser portion 25 accesses the Web server 6 having a host name described in the alternate URL through the communication control portion 23, to forward the alternate URL (process P3 in FIG. 4). The communication control portion 23 and the Web server 6 generally communicate with each other in accordance with the HTTP. Further, various types of signals defined by the HTTP are communicated in accordance with the TCP/IP. The Web server 6 starts the data converter 5 in response to the receiving of the alternate URL. Therefore, the Web server 6 transmits a part of the alternate URL to the data converter 5 (process P4), to set an environmental variable necessary to start CGI. The environmental variable includes a mail server name, a user ID and a password of the terminal 2, a message ID assigned to an E mail, and an attaching number. They are set in the query included in the alternate URL.

Figure 11:
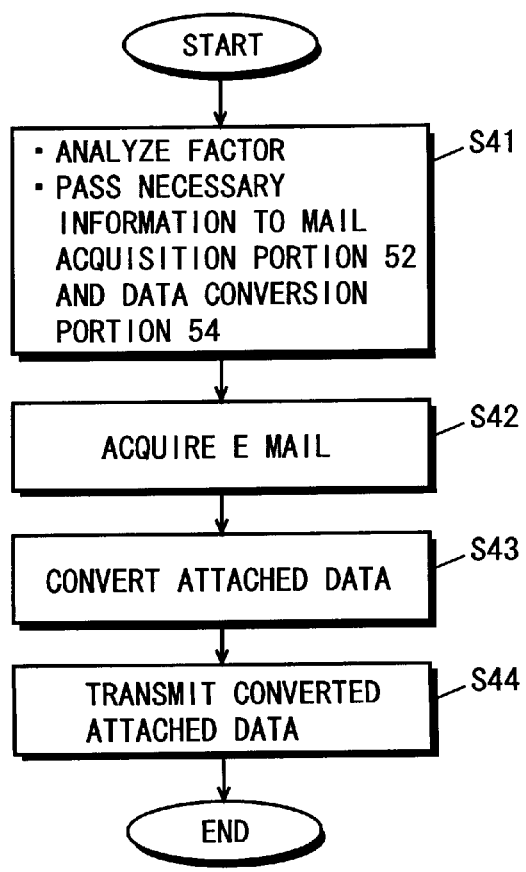
FIG. 11 is a flow chart showing the procedure for processing of a data converter 5 shown in FIG. 3.

The data converter 5 carries out, when the environmental variable is set by the Web server 6, the procedure shown in a flow chart of FIG. 11. The data receiving portion 51 analyzes a factor in the environmental variable (a mail server name, a password, a message ID assigned to an E mail, and an attaching number), and forwards necessary information to the mail acquisition portion 52 and the data conversion portion 53 (step S41). The mail acquisition portion 52 gets the mail server name, the user ID, the password, and the message ID assigned to the E mail as mail acquiring information. The data conversion portion 53 receives the attaching number.

The mail acquisition portion 52 accesses the mail server 7 through the data transmission portion 53 in accordance with the POP3 or the like. At this time, the data converter 5 uses the mail acquiring information relating to the terminal 2, so that it requests the mail server 7 to transmit the E mail in place of the terminal 2 (process P5). The mail server 7 transmits the E mail specified by the message ID in accordance with the request from the data converter 5 (process P6). The data receiving portion 51 receives the E mail from the mail server 7, so that the data converter 5 acquires the E mail routed to the terminal 2 (step S42). Further, data is attached to the E mail. It is judged that the attached data cannot be processed by the terminal 2 at the step S16 shown in FIG. 6.

The data conversion portion 54 receives the E mail received by the data receiving portion 51 as it is. The data conversion portion 54 takes out attached data specified by the attaching number obtained at the step S41 out of the data attached to the received E mail, and analyzes the format of the attached data. When the E mail is produced in a MIME, the format of the attached data can be specified if the Content-Type is analyzed. Consequently, the data conversion portion 54 can know what data format is used to generate the attached data. The data conversion portion 54 converts the attached data in the specified format into a text format or HTML (step S43).

The data transmission portion 53 transmits the converted attached data as document data to the Web server 6, and instructs the terminal 2 to transmit the attached data (step S44, process P7).

The Web server 6 transmits the received document data to the terminal 2 in accordance with the instruction from the data converter 5 (process P8). The browser portion 25 in the terminal 2 receives the document data through the communication control portion 23, and displays the document data on the display portion 24. The document data is obtained by converting the format of the attached data which is judged to be unprocessable at the step S16 shown in FIG. 6 into a text format or HTML. Further, the document data has a format which can be displayed standardly by the terminal 2.

As described in the foregoing, in the network according to the present embodiment, when the data which cannot be processed is attached to the E mail routed to the terminal 2, the alternate URL for specifying the attached data is issued. The browser portion 25 utilizes the alternate URL, to access the Web server 6. The data converter 5 acquires from the mail server 7 the E mail specified by the mail acquiring information constituting a part of the alternate URL. That is, the data converter 5 receives the E mail routed to the terminal 2 in place of the terminal 2. The data conversion portion 54 specifies the attached data which cannot be processed on the basis of the attaching number in the alternate URL, to convert the attached data into data in a format which cannot be processed by the terminal 2. The converted data is transmitted to the terminal 2 through the Web server 6. The browser portion 25 displays on the display portion 24 the data having the format which can be processed, and refers the user to the data.

Even if a terminal on the transmission side attaches to the E mail data, generated by application software, which cannot be correctly displayed by a terminal on the receiving side, therefore, the terminal 2 on the receiving side can receive from the data converter 5 data in a format which can be displayed and display the received data.

A lot of terminals 2 which are poor in processing capabilities, that is to say, typically a lot of portable terminals 2 may, in some cases, be connected to the above-mentioned network. It can be assumed that to the portable terminal 2, attached data which cannot be processed by itself are frequently transmitted. However, the data converter 5 contained in the network converts the attached data which cannot be processed into data in a format which can be processed in place of the terminals 2 which are poor in processing capabilities. When the data converter 5 is contained in the network, therefore, all the terminals 2 can display the data attached to the E mail without depending on the processing capabilities of the terminals 2.

In the above-mentioned embodiment, description was made, assuming that the attached data is converted into data in a text format or HTML. However, the data converter 5 may convert the format of the attached data into any format, provided that it is in a format which can be processed by the terminal 2. When document processing application software installed in the terminal 5 has its own data format, for example, the data converter 5 may convert the format of the attached data which cannot be processed by the terminal 5 into its own data format. That is, the data converter 5 may convert the format of the attached data into not only the text format or HTML but also any data format, provided that it is a format which can be processed by the terminal 2.

In the above-mentioned embodiment, description was made, assuming that the data conversion portion 54 converts data which is specified by the attaching number in the alternate URL out of all data attached to an E mail. However, the data conversion portion 54 may convert all the data attached to the received E mail into data in a data format, which can be processed by the terminal 2, represented in HTML. When a plurality of attached data are collectively converted, it is more preferable that the data conversion portion 54 generates document data representing an index which is related to the plurality of data which have already been converted in formats such as HTML, and transmits the document data to the terminal 2. That is, when the user of the terminal 2 operates the input portion 21, to designate a particular part of the displayed document data representing the index, the data, which has already been converted, desired to be referred to by the user is displayed on the display portion 24. Consequently, the terminal 2 becomes more user-friendly.

Figure 6:
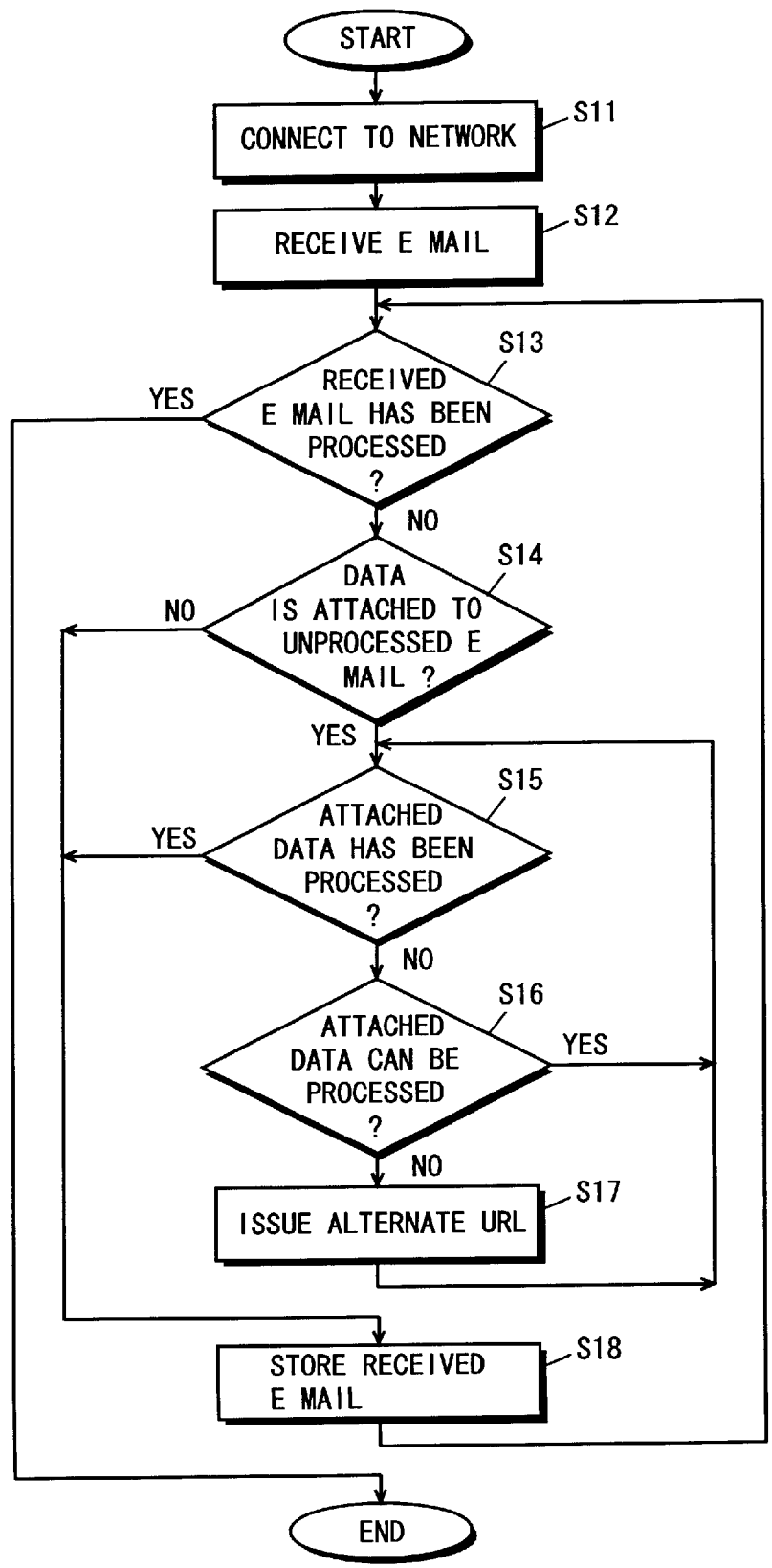
FIG. 6 is a flow chart showing the detailed procedure at the step S3 shown in FIG. 5.

In the above-mentioned embodiment, the alternate URL is issued immediately after it is judged whether or not the terminal 2 can process the attached data at the step S16 shown in FIG. 6. However, the step S16 may include processing for judging whether or not the attached data has a data format which can be converted by the data converter 5. When the step S16 further includes the processing, the mail processing portion 22 can be so constructed as not to issue an alternate URL with respect to a data format which cannot be converted by the data converter 5. Consequently, no useless alternate URL is issued.

In the above-mentioned embodiment, the processing for issuing the alternate URL (i.e., steps S13 to S17 in FIG. 6) is performed immediately after the E mail is received. However, the processing for issuing the alternate URL may be performed in the procedure shown in FIG. 9, that is, in a case where the user issues an instruction to display the E mail. Further, the processing for issuing the alternate URL may be performed in the procedure shown in FIG. 10, that is, in a case where the user issues an instruction to display the attached data.

According to the above-mentioned embodiment, the alternate URL is merely issued in the processing for issuing the alternate URL. However, the attached data which is judged to be unprocessable by the terminal 2 may be deleted from the storage area of the terminal 2. Consequently, the storage area of the terminal 2 is effectively utilized.

Furthermore, in the above-mentioned embodiment, the data converter 5 transmits the data which has already been converted to the terminal 2 through the Web server 6 as document data. However, the terminal 2 may add its own mail address to the alternate URL, and the data converter 5 may further attach the converted data and transmit the attached data to a mail address inputted by the alternate URL. Consequently, the terminal 2 can obtain the data converted by the data converter 5 not only from the Web server 6 but also through the mail server 7.

In the first embodiment, the terminal 2 transmits the alternate URL including its own user ID and password. The alternate URL is transmitted to the Web server 6 and the data converter 5 (see processes P3 and P4 in FIG. 4). However, the password is significantly important information for the user of the terminal 2. If they are misused, some problems arise. For example, the E mail of the user himself or herself is read by the others. Such a problem is solved by the second embodiment described below.

Second Embodiment

A network structure in the present embodiment is the same as that in the first embodiment. Therefore, components, corresponding to those in the structure shown in FIG. 1, in the present embodiment are assigned the same reference numerals. The detailed block structures of a terminal 2 and a data converter 5 in the present embodiment are also the same as those in the first embodiment. In the terminal 2 or the data converter 5 in the present embodiment, therefore, components corresponding to those shown in FIG. 2 or 3 are assigned the same reference numerals.

Figure 12:
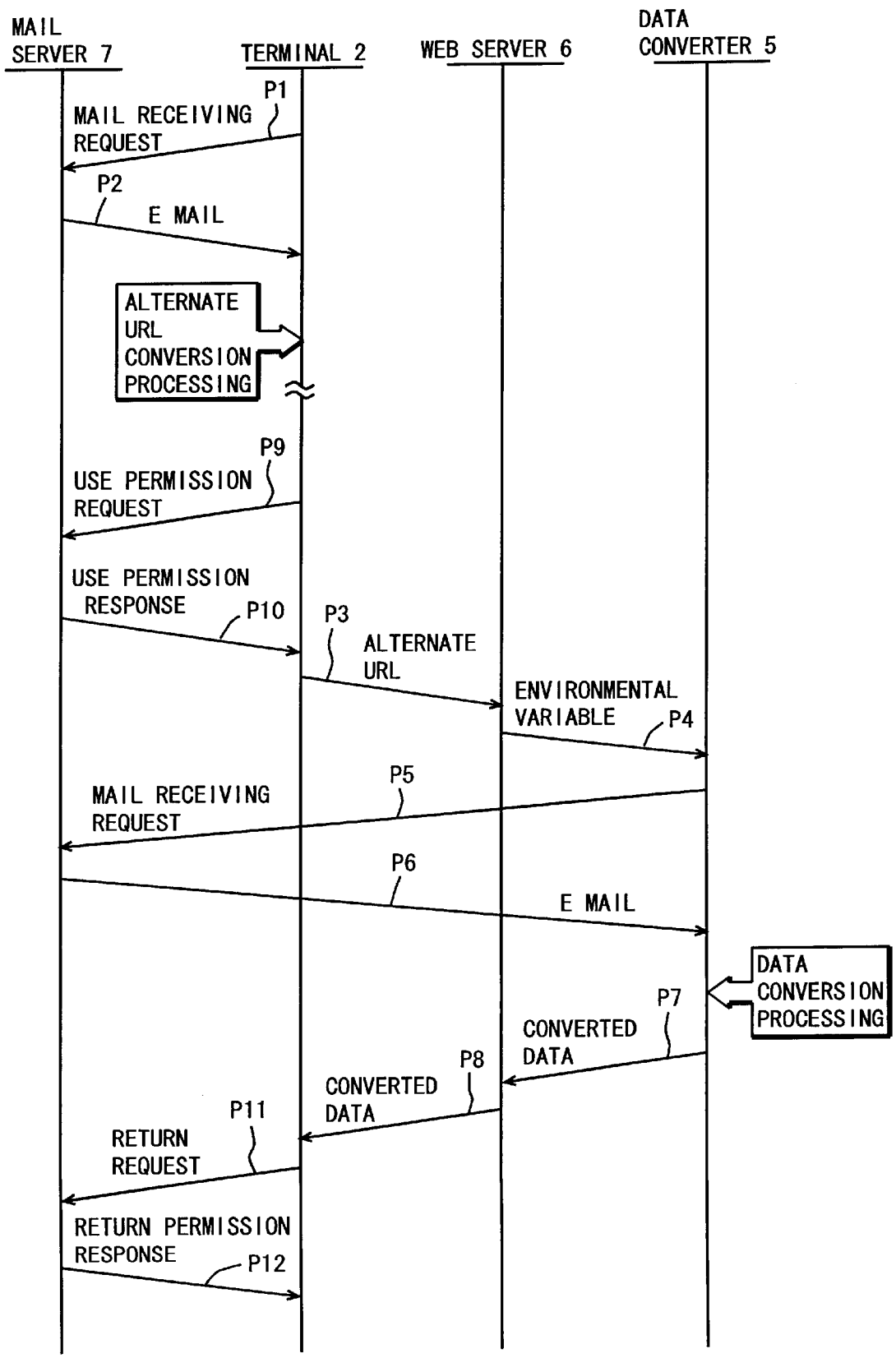
FIG. 12 is a sequence chart showing data communication in the network according to the second embodiment.

In the present embodiment, the procedure for communication between the terminal 2 and a mail server 7 and processing of a mail processing portion 22 in the terminal 2 respectively differ from those in the first embodiment. FIG. 12 is a sequence chart showing data communication in the network. The data communication shown in FIG. 12 is the same as that shown in FIG. 4 except that the procedures in processes P9 to P12 are added and hence, processes corresponding to the processes shown in FIG. 4 are assigned the same process numbers. FIG. 13 is a flow chart showing the procedure for the processing of the mail processing portion 22 according to the present embodiment. The procedure for the processing shown in FIG. 13 is the same as that shown in FIG. 5 except that steps S51 to S55 are added in place of the step S9 and hence, steps corresponding to the steps shown in FIG. 5 are assigned the same step numbers in FIG. 13. In FIG. 12 or FIG. 13, description of the same processes or steps as those shown in FIG. 4 or 5 is not repeated. The difference therebetween will be described.

As described in the first embodiment, the mail processing portion 22 issues an alternate URL to attached data which cannot be processed by the terminal 2. In the first embodiment, the password is set in the query included in the alternate URL. However, in the present embodiment, the mail processing portion 22 does not use a password previously held but issues its own password (hereinafter referred to as a temporary password). The temporary password is issued when the alternate URL is issued in the terminal 2 (step S17), unlike the password. It is preferable that temporary passwords are so issued as to differ from each other.

A user operates an input portion 21, when he or she desires to refer to document data specified by the alternate URL, to select the alternate URL. The mail processing portion 22 requests, when the alternate URL is inputted through the input portion 21 (step S51), permission to use the temporary password set in the alternate URL (step S52). That is, the temporary password is issued in the terminal 2. Even if the terminal 2 accesses the mail server 7 using the temporary password, therefore, the mail server 7 cannot identify the terminal 2. Therefore, the terminal 2 transmits to the mail server 7 a signal for requesting permission to use the temporary password issued by itself (hereinafter referred to as a use permission request) (process P9). The password of the terminal 2 and the issued temporary password are set in the use permission request. The mail server 7 transmits to the terminal 2 a signal for permitting to use the temporary passwords in response to the use permission request (hereinafter referred to as a use permission response) (process P10). Even if the terminal 2 or the data converter 5 accesses the mail server 7 using the temporary password, therefore, the mail server 7 can accurately identify the terminal 2 or the data converter 5.

The mail processing portion 22 forwards the alternate URL to a browser portion 25 after receiving the use permission response, to instruct the browser portion 25 to acquire document data specified by the alternate URL (step S53). Thereafter, the mail processing portion 22 waits until a display portion 24 displays the document data. The subsequent procedure for communication among the browser portion 25, the data converter 5 and a Web server 6 is the same as that in the first embodiment (processes P3 to P8). However, the data converter 5 differs from that in the first embodiment in that it accesses the mail server 7 using the temporary password, to acquire an E mail routed to the terminal 2. At this time, the browser portion 25 displays the document data specified by the alternate URL on the display portion 24, and then notifies the mail processing portion 22 that the document data is displayed. When the mail processing portion 22 is notified that the document data is displayed (step S54), no temporary password is required. Therefore, the mail processing portion 22 requests to return the temporary password which the mail server 7 currently uses for identifying the terminal 2 to an original password previously held. Consequently, the mail processing portion 22 transmits a signal for returning the password (hereinafter referred to as a return request) to the mail server 7 (process P11). The mail server 7 transmits a signal for permitting to return the temporary password to the original password in response to the return request (hereinafter referred to as a return permission response) (process P12). Consequently, the mail processing portion 22 returns the password to the original password (step S55). Consequently, the terminal 2 can acquire the E mail from the mail server 7 using the original password.

As described in the foregoing, according to the second embodiment, the temporary password is set to the alternate URL by the mail processing portion 22. The mail server 7 permits the use of the temporary password. The data converter 5 uses the temporary password, to acquire from the mail server 7 the E mail routed to the terminal 2. After the terminal 2 acquires the data converted by the data converter 5, the mail processing portion 22 processes the data so as to return the temporary password to the original password.

Therefore, it is possible to prevent the situations where a password which is high in secrecy to the terminal 2 leaks outward.

While the invention has been described in detail, the foregoing description is in all aspects illustrative and not restrictive. It is understood that numerous other modifications and variations can be devised without departing from the scope of the invention.

What is claimed is:

1. A data converter contained in a network capable of transmitting and receiving an E mail between a terminal and a mail server wherein the E mail includes data having a format such that the data is undisplayable by the terminal, said data converter comprising:

a receiving portion for receiving mail acquiring information for receiving, from the mail server, the E mail containing the data having the format such that the data is undisplayable by the terminal;

an acquisition portion for acquiring the E mail from the mail server based on the mail acquiring information received by said receiving portion;

a conversion portion for converting the format of the data of the E mail acquired by said acquisition portion into another format such that the data is displayable by the terminal; and a transmission portion for transmitting to the terminal the data converted by said conversion portion.

2. The data converter according to claim 1, wherein said conversion portion further converts the format(s) of all data attached to the E mail acquired by said acquisition portion, and generates data representing an index which is related to the data converted by the conversion portion, and said transmission portion transmits each of the data converted by the conversion portion and the generated data representing the index.

3. The data converter according to claim 1, wherein said transmission portion transmits the data converted by said conversion portion as an E mail to said terminal.

4. The data converter according to claim 2, wherein said transmission portion transmits the data converted by said conversion portion as an E mail to said terminal.

5. A terminal, together with a mail server and a data converter, contained in a network for acquiring an E mail from the mail server, wherein the E mail includes data having a format such that the data is undisplayable by said terminal, said terminal comprising:

a mail acquisition portion for acquiring the E mail from said mail server based on previously held mail acquiring information;

an issue portion for issuing an alternate URL (Uniform Resources Locator) including data specifying information for specifying the data included in the E mail and the mail acquiring information;

a transmission/instruction portion for transmitting the alternate URL issued by said issue portion and providing an instruction to said data converter to convert the data specified by the alternate URL, wherein said data converter is operable, based on the instruction, to convert the data specified by the alternate URL into another format such that the data is displayable by said terminal; and a display portion for receiving the data converted by said data converter into the other format such that the data is displayable by said terminal and displaying the received data.

6. The terminal according to claim 5, wherein said issue portion issues the alternate URL only to the data which can be converted by said data converter out of the data attached to the E mail acquired by said mail acquisition portion.

7. The terminal according to claim 6, further comprising a delete portion for deleting the attached data specified by the alternate URL issued by said issue portion.

8. The terminal according to claim 7, wherein said issue portion issues said alternate URL further including an address assigned to the E mail, and said transmission/instruction portion transmits the alternate URL issued by said issue portion, converts the format of the data specified by the alternate URL into a predetermined data format, and instructs said data converter to transmit the E mail to which the converted data is attached.

9. The terminal according to claim 8, wherein said issue portion includes temporary mail acquiring information in the alternate URL.

10. The terminal according to claim 7, wherein said issue portion includes temporary mail acquiring information in the alternate URL.

11. The terminal according to claim 6, wherein said issue portion issues said alternate URL further including an address assigned to the E mail, and said transmission/instruction portion transmits the alternate URL issued by said issue portion, converts the format of the data specified by the alternate URL into a predetermined data format, and instructs said data converter to transmit the E mail to which the converted data is attached.

12. The terminal according to claim 11, wherein said issue portion includes temporary mail acquiring information in the alternate URL.

13. The terminal according to claim 6, wherein said issue portion includes temporary mail acquiring information in the alternate URL.

14. The terminal according to claim 5, further comprising a delete portion for deleting the attached data specified by the alternate URL issued by said issue portion.

15. The terminal according to claim 14, wherein said issue portion issues said alternate URL further including an address assigned to the E mail, and said transmission/instruction portion transmits the alternate URL issued by said issue portion, converts the format of the data specified by the alternate URL into a predetermined data format, and instructs said data converter to transmit the E mail to which the converted data is attached.

16. The terminal according to claim 15, wherein said issue portion includes temporary mail acquiring information in the alternate URL.

17. The terminal according to claim 14, wherein said issue portion includes temporary mail acquiring information in the alternate URL.

18. The terminal according to claim 5, wherein said issue portion issues said alternate URL further including an address assigned to the E mail, and said transmission/instruction portion transmits the alternate URL issued by said issue portion, converts the format of the data specified by the alternate URL into a predetermined data format, and instructs said data converter to transmit the E mail to which the converted data is attached.

19. The terminal according to claim 18, wherein said issue portion includes temporary mail acquiring information in the alternate URL.

20. The terminal according to claim 5, wherein said issue portion includes temporary mail acquiring information in the alternate URL.

* * * * *